(12) United States Patent
Masuda

(10) Patent No.: US 10,603,953 B2
(45) Date of Patent: Mar. 31, 2020

(54) DRIVE DEVICE

(71) Applicant: KABUSHIKI KAISHA TOYOTA JIDOSHOKKI, Kariya-shi, Aichi-ken (JP)

(72) Inventor: Hideo Masuda, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 146 days.

(21) Appl. No.: 15/983,579

(22) Filed: May 18, 2018

(65) Prior Publication Data

US 2018/0339549 A1 Nov. 29, 2018

(30) Foreign Application Priority Data

May 25, 2017 (JP) .................................. 2017-103818

(51) Int. Cl.
*B60B 27/00* (2006.01)
*B60T 1/06* (2006.01)
(Continued)

(52) U.S. Cl.
CPC ...... *B60B 27/0052* (2013.01); *B60B 27/0073* (2013.01); *B60B 27/06* (2013.01); *B60B 35/125* (2013.01); *B60T 1/062* (2013.01); *B60T 1/065* (2013.01); *F16D 55/24* (2013.01); *F16D 55/36* (2013.01); *F16D 65/0081* (2013.01); *F16D 65/186* (2013.01); *B60B 11/06* (2013.01); *B60B 27/0015* (2013.01); *B60B 27/0021* (2013.01); *B60B 27/065* (2013.01); *B60B 2900/211* (2013.01); *B60B 2900/212* (2013.01);
(Continued)

(58) Field of Classification Search
CPC . B60B 27/0052; B60B 27/0073; B60B 27/06; B60B 35/125; B60B 11/06; B60T 1/062; B60T 1/065; F16D 55/24; F16D 55/36; F16D 65/0081; F16D 65/186
See application file for complete search history.

(56) References Cited

U.S. PATENT DOCUMENTS

| | | | | |
|---|---|---|---|---|
| 4,649,772 A | * | 3/1987 | Daniel ................. | B60K 17/046 180/10 |
| 9,868,322 B1 | * | 1/2018 | Varela ................... | B60B 35/125 |

(Continued)

FOREIGN PATENT DOCUMENTS

| | | |
|---|---|---|
| JP | 2000-297830 A | 10/2000 |
| JP | 2001-193768 A | 7/2001 |

(Continued)

*Primary Examiner* — Kip T Kotter
(74) *Attorney, Agent, or Firm* — Sughrue Mion, PLLC

(57) ABSTRACT

A drive device for driving and rotating a wheel includes an axle shaft, a hub to which rotation of the axle shaft is conveyed, a plurality of fasteners for securing the wheel to the hub, a wet brake, a housing, an oil seal, and a cover. The wet brake is configured to restrain the rotation of the axle shaft. The housing accommodates the axle shaft and the wet brake. The oil seal is disposed between the housing and a part of the hub that is disposed inward of the fasteners in a radial direction of the hub. The cover has an annular shape. The cover is disposed in a space formed between the hub and the housing, and is secured to the housing. The cover is configured to cover the plurality of fasteners.

3 Claims, 2 Drawing Sheets

(51) Int. Cl.
  *F16D 55/36*   (2006.01)
  *F16D 65/00*   (2006.01)
  *F16D 55/24*   (2006.01)
  *B60B 35/12*   (2006.01)
  *F16D 65/18*   (2006.01)
  *B60B 27/06*   (2006.01)
  *F16D 55/00*   (2006.01)
  *B66F 9/075*   (2006.01)
  *B60B 11/06*   (2006.01)

(52) U.S. Cl.
  CPC ........... *B60B 2900/3312* (2013.01); *B60B 2900/5112* (2013.01); *B60B 2900/5114* (2013.01); *B60B 2900/5118* (2013.01); *B66F 9/07509* (2013.01); *F16D 2055/0033* (2013.01)

(56) References Cited

U.S. PATENT DOCUMENTS

| | | | |
|---|---|---|---|
| 2005/0020400 A1* | 1/2005 | Chung | B60B 11/06 475/331 |
| 2013/0056289 A1* | 3/2013 | Shibukawa | B60K 17/046 180/62 |
| 2017/0120675 A1* | 5/2017 | Chung | B60K 17/046 |
| 2017/0120676 A1* | 5/2017 | Chung | B60B 35/125 |
| 2017/0129331 A1* | 5/2017 | Naitou | F16D 65/186 |

FOREIGN PATENT DOCUMENTS

| | | | | |
|---|---|---|---|---|
| WO | WO-2005005167 A1 * | 1/2005 | | B60B 3/16 |
| WO | WO-2016002287 A1 * | 1/2016 | | F16H 57/0473 |

* cited by examiner

DRIVE DEVICE

BACKGROUND ART

The present disclosure relates to a drive device.

A drive device including a wet brake is well known as an example of a drive device, and is mentioned, for example, in Japanese Unexamined Patent Application Publication No. 2001-193768. The drive device mentioned in the publication includes a wet brake, and a hub to which an inner gear shaft of the wet brake is coupled and a wheel is secured. In this wet brake, an oil seal is disposed between the inner gear shaft and a seal housing.

The drive device mentioned in the above-mentioned publication has a possibility that the rotating hub may catch something like a string on the ground and may carry it to the oil seal, which may cause damage on the oil seal.

The present disclosure, which has been made in light of the above-described problem, is directed to providing a drive device configured such that possible damage on an oil seal is eliminated or minimized.

SUMMARY

In accordance with one aspect of the present disclosure, a drive device for driving and rotating a wheel that includes an axle shaft, a hub to which rotation of the axle shaft is conveyed, a plurality of fasteners for securing the wheel to the hub, a wet brake, a housing, an oil seal, and a cover is provided. The wet brake is configured to restrain the rotation of the axle shaft. The housing accommodates the axle shaft and the wet brake. The oil seal is disposed between the housing and a part of the hub that is disposed inward of the fasteners in a radial direction of the hub. The cover has an annular shape. The cover is disposed in a space formed between the hub and the housing, and is secured to the housing. The cover is configured to cover the plurality of fasteners.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof, may best be understood by reference to the following description of the presently preferred embodiments together with the accompanying drawings in which.

DETAILED DESCRIPTION OF THE EMBODIMENTS

Figure 1:
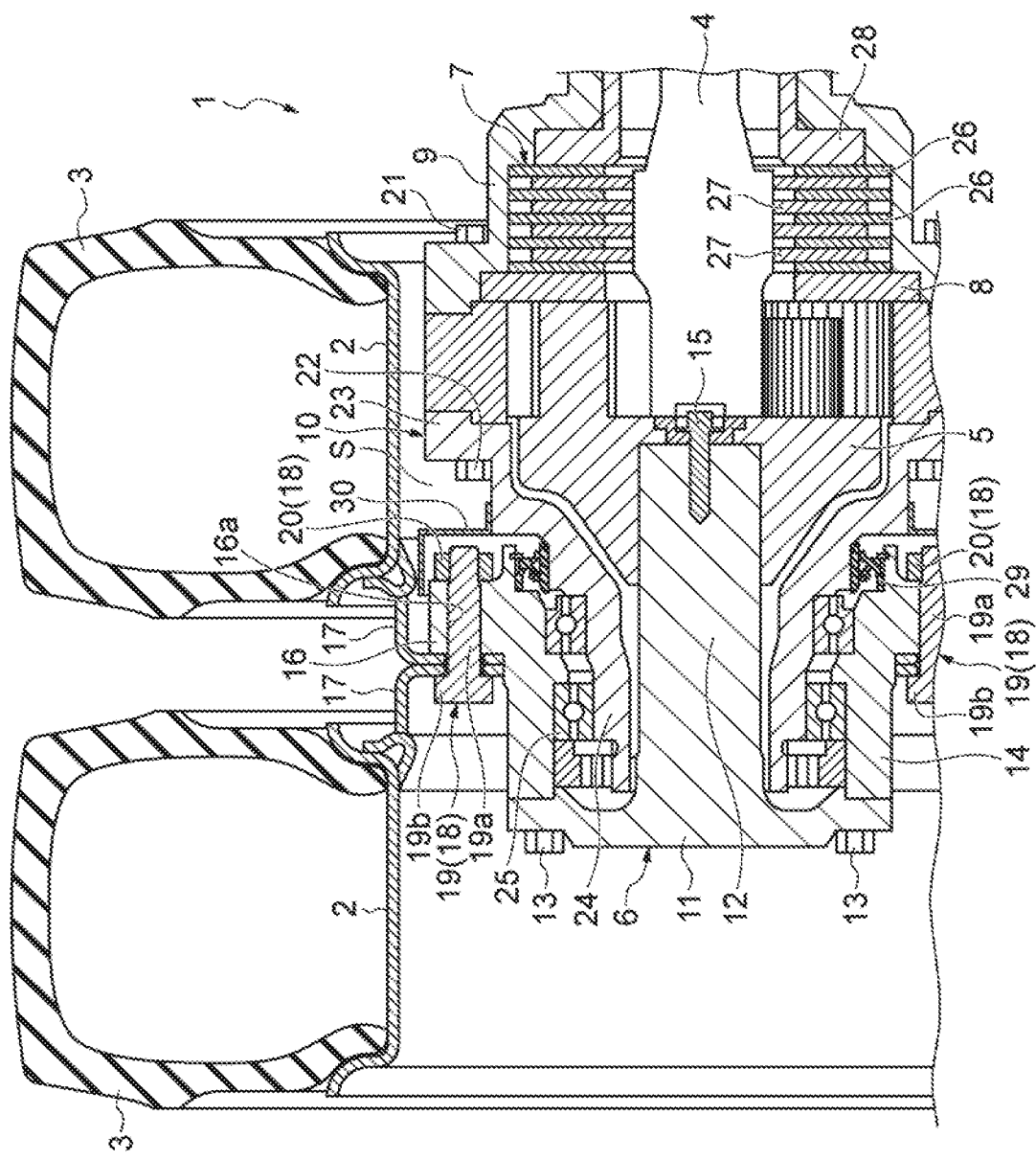
FIG. 1 is a fragmentary sectional view of a drive device according to an embodiment of the present disclosure.
Figure 2:
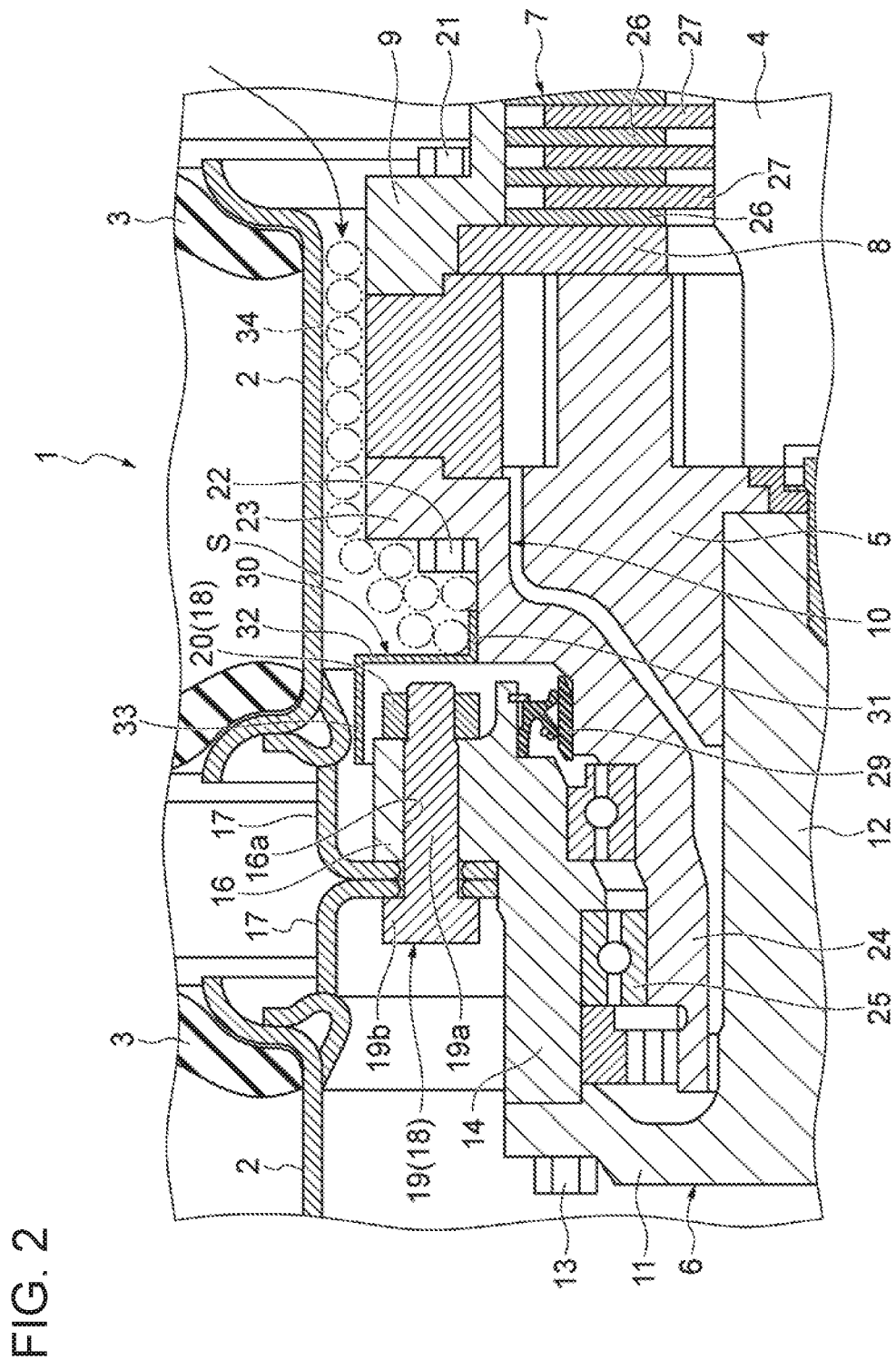
FIG. 2 is an enlarged sectional view of the drive device of FIG. 1 with a string entering a gap between a wheel and a housing of the drive device.

The following will describe an embodiment of the present disclosure with reference to the accompanying FIGS. 1 and 2 that depict one end of a drive device.

FIG. 1 is a fragmentary sectional view of a drive device according to an embodiment of the present disclosure. Referring to FIG. 1, a drive device 1 is mounted, for example, to a forklift truck. The drive device 1 is a device to drive and rotate a wheel of the forklift truck, which, in this embodiment, is a plurality of wheels 2. Specifically, in this embodiment, two wheels 2 each have a tire 3, and are mounted side by side to each of the right end and the left end of the drive device 1. That is, the forklift truck according to this embodiment of the present disclosure has a dual-tire configuration.

The drive device 1 includes an axle shaft 4, a reduction gear 5, a hub 6, a wet brake 7, a retainer 8, a housing 9, and a housing 10. The axle shaft 4 is connected to a differential (not shown). The reduction gear 5 is configured to reduce a rotational speed of the axle shaft 4 to output a lower rotational speed of the axle shaft 4. The hub 6 is attached to the reduction gear 5. The wet brake 7 is configured to restrain rotation of the axle shaft 4 and therefore restrain rotation of the wheels 2. The retainer 8 is disposed between the reduction gear 5 and the wet brake 7. The housing 9 accommodates the axle shaft 4, the wet brake 7, and the retainer 8. The housing 10 accommodates the reduction gear 5 and a part of the hub 6.

The reduction gear 5, which is not elaborated herein, has a planetary gear mechanism including, for example, a sun gear, planetary gears, a planetary carrier, and an internal gear. The reduction gear 5 is configured to convey the rotation of the axle shaft 4 to the hub 6.

The hub 6 includes a hub body 11 having a disc shape, a shaft 12 formed integrally with the hub body 11, and an attachment 14 having an approximately cylindrical shape. The shaft 12 extends from a center of the hub body 11 coaxially with the axle shaft 4 and inwardly in an axial direction of the axle shaft 4 with respect to the forklift truck (i.e., toward the axle shaft 4). The shaft 12 is secured to the reduction gear 5 by a bolt 15. The attachment 14 is disposed coaxially with the shaft 12, and is secured to a periphery of the hub body 11 by a plurality of bolts 13 such that the attachment 14 is disposed inward of the hub body 11 in the axial direction of the axle shaft 4 with respect to the forklift truck.

The attachment 14 has a coupling flange 16 projecting from an outer peripheral surface of the attachment 14 such that the coupling flange 16 has an annular shape. As shown in FIG. 2, each wheel 2 is secured to the coupling flange 16 of the hub 6 by a plurality of fasteners 18 using a ring bracket 17. The ring bracket 17 has an L-shape in section as shown in FIGS. 1 and 2, and is integrated with the wheel 2. Each fastener 18 includes a hub bolt 19 and a nut 20 mounted on a shank 19a of the hub bolt 19.

The coupling flange 16 has through holes 16a each receiving the shank 19a of the hub bolt 19. The shank 19a of the hub bolt 19 is inserted into the through hole 16a inwardly in the axial direction of the axle shaft 4 with respect to the forklift truck such that a head 19b of the hub bolt 19 presses the ring brackets 17 to an surface of the coupling flange 16 outwardly oriented in the axial direction of the axle shaft 4 with respect to the forklift truck. Then, the nut 20 is mounted on a threaded end of the shank 19a to secure the wheels 2 to the hub 6. That is, the wheels 2 are secured to the hub 6 by the fasteners 18 (i.e., plural pairs of the hub bolt 19 and the nut 20).

The housing 10 is disposed outward of the housing 9 in the axial direction of the axle shaft 4 with respect to the forklift truck. The housing 10 is secured to the housing 9 by plural pairs of a bolt 21 and a nut 22, and accommodates the reduction gear 5 and the shaft 12 of the hub 6.

The housing 10 includes an exterior portion 23 formed around the reduction gear 5, and an insertion portion 24. The insertion portion 24 extends outwardly from the exterior portion 23 in the axial direction of the axle shaft 4 with respect to the forklift truck, and is interposed between the shaft 12 and the attachment 14 of the hub 6. A plurality of bearings 25 is disposed between the attachment 14 and the insertion portion 24.

The wet brake 7 includes a plurality of non-rotatable brake discs 26, a plurality of rotatable brake discs 27, and a thrust member 28. The non-rotatable and the rotatable brake discs 26, 27 each have a hollow disc shape. The non-rotatable brake discs 26 are splined to an inner peripheral surface of the housing 9 such that the non-rotatable brake discs 26 are movable in the axial direction of the axle shaft 4. The rotatable brake discs 27 are splined to an outer peripheral surface of the axle shaft 4 such that the rotatable brake discs 27 are movable in the axial direction of the axle shaft 4. The thrust member 28 is disposed across the non-rotatable and the rotatable brake discs 26, 27 from the hub 6, and is configured to press the non-rotatable and the rotatable brake discs 26, 27 outwardly in the axial direction of the axle shaft 4 with respect to the forklift truck, in other words, the thrust member 28 is configured to press the brake discs 26, 27 toward the hub 6. Each rotatable brake disc 27 is interposed between any two adjacent non-rotatable brake discs 26. That is, the rotatable brake discs 27 are interleaved with the rotatable brake discs 26. The housings 9, 10 are filled with brake fluid that is used for moving the thrust member 28.

In the wet brake 7, in response to a pressing operation of a brake pedal (not shown) that is disposed in a driver's section, a pressure from the brake fluid pushes the thrust member 28 outwardly in the axial direction of the axle shaft 4 with respect to the forklift truck. The thrust member 28 pushes the non-rotatable and the rotatable brake discs 26, 27 outwardly in the axial direction of the axle shaft 4 with respect to the forklift truck to press the non-rotatable and the rotatable brake discs 26, 27 against the retainer 8. This applies a brake to the axle shaft 4, thereby restraining the rotation of the wheels 2.

In response to a release operation of the brake pedal, the thrust member 28 is restored to its original position by urging force of a spring (not shown) to release the non-rotatable and the rotatable brake discs 26, 27 from compression by the thrust member 28 and the retainer 8, thereby releasing the brake on the axle shaft 4.

As shown in FIG. 2, an oil seal 29 is disposed between the insertion portion 24 of the housing 10 and a part of the hub 6, which, in this embodiment, is the attachment 14 of the hub 6, to prevent escape of the brake fluid from the housing 10. The attachment 14 is disposed inward of the fasteners 18 in a radial direction of the hub 6. That is, the oil seal 29 is disposed inward of the fasteners 18 (between the fasteners 18 and the shaft 12) in the radial direction of the hub 6. The oil seal 29 is disposed inward of the bearings 25 in the axial direction of the axle shaft 4 with respect to the forklift truck.

The oil seal 29 includes a sealing lip made of a rubber material, a contact portion made of a rubber material, a metal ring, and a spring. The sealing lip is disposed in contact with the attachment portion 14. The contact portion is formed integrally with the sealing lip and disposed in contact with the insertion portion 24. The metal ring is configured to ensure settlement of the contact portion on the insertion portion 24. The spring is configured to firmly press the sealing lip to the attachment 14.

The drive device 1 further includes a cover 30 having an annular shape to cover the fasteners 18. The cover 30 is disposed in a space S formed between the attachment 14 of the hub 6 and the housing 10 and secured to the housing 10. The cover 30 has a Z-bend shape in section as shown in FIGS. 1 and 2.

Specifically, as shown in FIG. 2, the cover 30 includes a fixing portion 31 having a cylindrical shape, a main covering portion 32 having a hollow disc shape, and an auxiliary covering portion 33 having a cylindrical shape. The fixing portion 31 is secured to an outer peripheral surface of the exterior portion 23 of the housing 10. The main covering portion 32 extends outwardly in the radial direction of the hub 6 from an edge of the fixing portion 31 that is an axially outer one of edges of the fixing portion 31 in the axial direction of the axle shaft 4 with respect to the forklift truck, and faces an end surface of each fastener 18 that is inwardly oriented in the axial direction of the axle shaft 4 with respect to the forklift truck. The auxiliary covering portion 33 extends outwardly from an outer peripheral edge of the main covering portion 32 in the axial direction of the axle shaft 4 with respect to the forklift truck such that the auxiliary covering portion 33 extends away from the fixing portion 31 in the axial direction of the axle shaft 4.

The cover 30 is comprised of, for example, a metal plate. The fixing portion 31, the main covering portion 32, and the auxiliary covering portion 33 are fabricated individually, and the fixing portion 31 and the auxiliary covering portion 33 are welded to the main covering portion 32 in this embodiment. However, the fixing portion 31, the main covering portion 32, and the auxiliary covering portion 33 may be fabricated as a single integral component by way of press working.

The fixing portion 31 is fitted in the outer peripheral surface of the exterior portion 23, for example, in such a manner that the fixing portion 31 is driven in the exterior portion 23 inwardly in the axial direction of the axle shaft 4 with respect to the forklift truck. The main covering portion 32 faces the end surface of each fastener 18, specifically, faces the threaded end of the shank 19a of the hub bolt 19 and one end surface of the nut 20 that is inwardly oriented in the axial direction of the axle shaft 4 with respect to the forklift truck. The auxiliary covering portion 33 extends from the main covering portion 32 such that the auxiliary covering portion 33 is disposed between the coupling flange 16 of the attachment 14 and one of the wheels 2 that is disposed inward of the other in the axial direction of the axle shaft 4 with respect to the forklift truck. This configuration ensures that the threaded end of the hub bolt 19 and the nut 20 are covered by the cover 30. The main covering portion 32 and the auxiliary covering portion 33 may each have a slightly uneven surface.

In the drive device 1 configured as described above, the hub 6 is rotated by the rotation of the axle shaft 4 that is conveyed to the hub 6 via the reduction gear 5, and therefore the wheels 2 secured to the hub 6 by the fasteners 18 are rotated to run the forklift truck.

The wheel 2 disposed inward of the other wheel 2 may catch something like a string 34 on the ground and may cause the string 34 to enter a gap between the wheel 2 and the housings 9, 10, as shown in FIG. 2, while the forklift truck runs. In this case, the string 34 may wind around any of the fasteners 18 (i.e., any hub bolt 19 and any nut 20) and then may wind around the rotating hub 6. The rotating hub 6 may carry the string 34 in the radial direction of the hub 6 to the oil seal 29. This may cause the string 34 to damage the oil seal 29.

To prevent such a problem, in this embodiment, the fasteners 18 are covered by the annular cover 30 that is disposed in the space S formed between the hub 6 and the housing 10 and is secured to the housing 10. This configuration prevents the string 34 entering the space S between the hub 6 and the housing 10 from winding around any fastener 18 and the hub 6, thereby preventing the string 34 from being carried to the oil seal 29 by the rotating hub 6 and from damaging the oil seal 29.

The cover 30 is secured to the housing 10 such that the cover 30 does not rotate. This configuration prevents the string 34 from tightly winding around the cover 30 and dragging the cover 30 toward the oil seal 29.

In this embodiment, the cover 30 includes the fixing portion 31 having a cylindrical shape and the main covering portion 32 having a hollow disc shape. The fixing portion 31 is secured to the outer peripheral surface of the housing 10. The main covering portion 32 extends outwardly in the radial direction of the hub 6 from the axially outer edge of the fixing portion 31 with respect to the forklift truck, and faces the end surface of each fastener 18 that is inwardly oriented with respect to the forklift truck. This configuration enables easy fabrication of the cover 30 from, for example, a metal plate, and enables the cover 30 easily and firmly to be secured to the housing 10.

In this embodiment, the cover 30 further includes the auxiliary covering portion 33 having a cylindrical shape and extending from the outer peripheral edge of the main covering portion 32 such that the auxiliary covering portion 33 extends away from the fixing portion 31 in the axial direction of the axle shaft 4. This configuration increases an area where the fasteners 18 are covered by the cover 30, thereby further preventing the string 34 from winding around the fasteners 18 and the hub 6.

The main covering portion 32 and the auxiliary covering portion 33 each have a slightly uneven surface to make the string 34 less likely to wind around the main covering portion 32 and the auxiliary covering portion 33.

The present disclosure is not limited to the above-described embodiment. For example, in the embodiment, each hub bolt 19 is disposed such that the head 19b is disposed outward of the nut 20 in the axial direction of the axle shaft 4 with respect to the forklift truck. However, the hub bolt 19 may be disposed such that the nut 20 is disposed outward of the head 19b in the axial direction of the axle shaft 4 with respect to the forklift truck. In this case, only the hub bolt 19 is covered by the cover 30.

In this embodiment, the cover 30 includes the fixing portion 31, the main covering portion 32, and the auxiliary covering portion 33. However, this configuration of the cover 30 may be modified as long as the cover 30 is secured to the housing 10. For example, the cover 30 need not necessarily include the auxiliary covering portion 33. The cover 30 may have a curved shape.

In this embodiment, the cover 30 is secured to the outer peripheral surface of the housing 10. However, the cover 30 may be secured to any other part of the housing 10 such as a surface that faces the oil seal 29.

The drive device 1 according to the embodiment of the present disclosure is applied to a forklift truck having a dual-tire configuration. However, the drive device 1 according to the embodiment is applicable to any other vehicles including a forklift truck having a single-tire configuration in which a single wheel 2 is mounted to each end of the drive device 1.

What is claimed is:

1. A drive device for driving and rotating a wheel, the drive device comprising:
   an axle shaft;
   a hub to which rotation of the axle shaft is conveyed;
   a plurality of fasteners for securing the wheel to the hub;
   a wet brake configured to restrain the rotation of the axle shaft;
   a housing accommodating the axle shaft and the wet brake;
   an oil seal disposed between the housing and a part of the hub that is disposed inward of the fasteners in a radial direction of the hub; and
   a cover having an annular shape, the cover being disposed in a space formed between the hub and the housing and being secured to the housing, the cover being configured to cover the plurality of fasteners.

2. The drive device according to claim 1, wherein
   the cover includes a fixing portion having a cylindrical shape and a main covering portion having a hollow disc shape,
   the fixing portion is secured to an outer peripheral surface of the housing, and
   the main covering portion extends outwardly from the fixing portion in the radial direction of the hub and faces an end surface of each fastener.

3. The drive device according to claim 2, wherein
   the cover further includes an auxiliary covering portion having a cylindrical shape, and
   the auxiliary covering portion extends from an outer peripheral edge of the main covering portion such that the auxiliary covering portion extends away from the fixing portion in an axial direction of the axle shaft.

* * * * *